(12) United States Patent
Inagaki

(10) Patent No.: US 7,866,763 B2
(45) Date of Patent: *Jan. 11, 2011

(54) AUTOMATIC PARKING BRAKE DEVICE

(75) Inventor: Hiromi Inagaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1061 days.

This patent is subject to a terminal disclaimer.

(21) Appl. No.: 10/571,739

(22) PCT Filed: Oct. 4, 2004

(86) PCT No.: PCT/JP2004/014582

§ 371 (c)(1), (2), (4) Date: Dec. 15, 2006

(87) PCT Pub. No.: WO2005/033541

PCT Pub. Date: Apr. 14, 2005

(65) Prior Publication Data

US 2007/0182242 A1     Aug. 9, 2007

(30) Foreign Application Priority Data

Oct. 2, 2003    (JP)  .............................. 2003-344995

(51) Int. Cl.
*B60T 25/08* (2006.01)
(52) U.S. Cl. .................... 303/89; 188/106 F; 188/72.4; 188/265
(58) Field of Classification Search .............. 303/191, 303/89, 71; 188/160 F, 170, 72.4, 265, 106 P, 188/72.3, 72.7
See application file for complete search history.

(56) References Cited

U.S. PATENT DOCUMENTS

| | | | |
|---|---|---|---|
| 3,684,063 A | 8/1972 | Crabtree | |
| 3,770,084 A | 11/1973 | Hill | |
| 5,954,162 A | 9/1999 | Feigel et al. | |
| 6,053,289 A | 4/2000 | Bauer et al. | |
| 6,186,284 B1 * | 2/2001 | Sauter et al. | 188/33 |
| 6,311,808 B1 | 11/2001 | Halasy-Wimmer et al. | |

(Continued)

FOREIGN PATENT DOCUMENTS

JP    46-7913    12/1971

(Continued)

*Primary Examiner*—Xuan Lan Nguyen
(74) *Attorney, Agent, or Firm*—Carrier Blackman & Associates, P.C.; William D. Blackman; Joseph P. Carrier (57) ABSTRACT

An automatic parking brake system is provided in which a parking piston that enables a parking brake state to be obtained by forward movement in response to a parking control fluid pressure acting on a rear face of the parking piston is slidably fitted into a casing, and a lock mechanism is provided within the casing in back of the parking piston to automatically lock in response to forward movement of the parking piston in order to mechanically lock the parking piston at a forward position and unlock in response to a parking release control fluid pressure acting on the lock mechanism, the parking control fluid pressure and the parking release control fluid pressure being obtained by a fluid pressure control mechanism for controlling a fluid pressure generated by a fluid pressure source. This enables an automatic parking brake state to be obtained by a simple structure without consuming power.

4 Claims, 6 Drawing Sheets

U.S. PATENT DOCUMENTS

| | | | |
|---|---|---|---|
| 6,823,976 B2 * | 11/2004 | Schmid | 192/219.5 |
| 7,651,175 B2 * | 1/2010 | Inagaki et al. | 303/89 |
| 2007/0267255 A1 * | 11/2007 | Inagaki et al. | 188/72.4 |
| 2007/0278052 A1 * | 12/2007 | Inagaki et al. | 188/151 R |

FOREIGN PATENT DOCUMENTS

| | | |
|---|---|---|
| JP | 49-2822 | 1/1974 |
| JP | 60-049141 | 3/1985 |
| JP | 1-168032 | 11/1989 |
| JP | 3-22140 | 3/1991 |
| JP | 10-512947 | 12/1998 |
| JP | 11-507714 | 7/1999 |
| JP | 2000-504811 | 4/2000 |

* cited by examiner

AUTOMATIC PARKING BRAKE DEVICE

TECHNICAL FIELD

The present invention relates to an automatic parking brake system and, in particular, to an automatic parking brake system that enables a parking brake state to be automatically obtained without requiring a vehicle driver to operate a parking brake operating member such as a parking brake pedal or a parking brake lever.

BACKGROUND ART

Parking brake systems in which a parking brake state is obtained by locking a brake piston in its fluid pressure operating state are already known from, for example, Patent Publications 1 and 2.

Patent Publication 1: Japanese Patent Publication (PCT) No. 10-512947
Patent Publication 2: Japanese Patent Publication (PCT) No. 2000-504811

DISCLOSURE OF THE INVENTION

Problems to be Solved by the Invention

In Patent Publication 1, the brake piston is divided into front and rear brake pistons, a spring is provided in a compressed state between a transmission member abutting against the front end of the rear brake piston and a blocking plate fixed to the front brake piston, a latch capable of meshing with inner teeth cut into an inner face of a brake caliper to the rear of the front brake piston is housed within the brake caliper so as to engage with the inner teeth in a state in which the transmission member abuts against the front end of the rear brake piston but disengage from the inner teeth due to the urging force of the spring when the transmission member moves forward relative to the front end of the rear brake piston, and an auxiliary piston is slidably fitted into the rear brake piston, the auxiliary piston being capable of moving the transmission member in the axial direction relative to the rear brake piston. Since it is necessary to cut the inner teeth on the inner face of the brake caliper and house the latch within the brake caliper while dividing the brake piston into the front and rear brake pistons, the structure of the interior of the brake caliper is complicated.

Furthermore, in Patent Publication 2, an adjustment bolt having its front end part fixedly connected to the brake piston is screwed into an adjustment nut, an electromagnet exhibiting an electromagnetic force for making the adjustment nut frictionally engage with a casing is disposed within a brake caliper to the rear of the adjustment nut, and when obtaining a parking brake state, the electromagnet makes the adjustment nut frictionally engage with the casing in a state in which brake fluid pressure acts on the brake piston, thus preventing the brake piston from retreating. However, not only is it necessary to house the electromagnet within the brake caliper, thus making the structure complicated, but it is also necessary to maintain an energized state of a winding of the electromagnet in the parking brake state, thus increasing the power consumption.

The present invention has been accomplished under the above-mentioned circumstances, and it is an object thereof to provide an automatic parking brake system that enables an automatic parking brake state to be obtained by a simple structure without consuming power.

Means for Solving the Problems

In order to attain the above object, according to a first aspect of the present invention, there is proposed an automatic parking brake system comprising: a parking piston slidably fitted into a casing so that a parking brake state can be obtained by forward movement in response to a parking control fluid pressure acting on a rear face of the parking piston; a lock mechanism provided within the casing to the rear side of the parking piston so as to automatically lock in response to forward movement of the parking piston in order to mechanically lock the parking piston at a forward position and unlock in response to a parking release control fluid pressure acting on the lock mechanism; a fluid pressure source; and fluid pressure control means for controlling a fluid pressure generated by the fluid pressure source so that the parking control fluid pressure and the parking release control fluid pressure can be obtained.

According to a second aspect of the present invention, in addition to the first aspect, there is proposed an automatic parking brake system, wherein the lock mechanism comprises a lock piston slidably fitted into the casing to the rear side of the parking piston so that a forward urging force acts on the lock piston at least when the parking piston moves forward and allowing a parking release control pressure to be made to act on the lock piston toward the rear; a cylindrical retaining tube integrally and coaxially connected to a rear part of the parking piston; spheres retained at a plurality of positions in the peripheral direction of the retaining tube so that the spheres can move along the radial direction of the retaining tube; and an insertion shaft inserted into the retaining tube so that the insertion shaft can move axially relative to the retaining tube and connected integrally to the front end of the lock piston so as to be in contact with the spheres from the inside of the retaining tube; a large diameter hole portion having a larger diameter than that of the retaining tube and a small diameter hole portion being formed on an inner face of the casing between the parking piston and the lock piston so that a forward-facing annular latching step is interposed between the large diameter hole portion and the small diameter hole portion, the small diameter hole portion being formed so as to have a smaller diameter than that of the large diameter hole portion and be able to be inserted into the retaining tube and being disposed to the rear of the large diameter hole portion; and the insertion shaft being formed by coaxially and integrally connecting a front small diameter shaft portion and a rear large diameter shaft portion via a tapered step that is capable of changing the position of contact of each of the spheres between the small diameter shaft portion and the large diameter shaft portion, the small diameter shaft portion being in contact with each of the spheres so as to be capable of putting each of the spheres in rolling contact with an inner face of the small diameter hole portion in a state in which the parking piston is at a retreat limit, and the large diameter shaft portion being connected coaxially to the small diameter shaft portion so as to be capable of pushing each of the spheres outward along the radial direction of the retaining tube in order to make the spheres contact the large diameter hole portion in response to the parking piston moving forward from the retreat limit and the lock piston moving forward.

According to a third aspect of the present invention, in addition to either the first or second aspect, there is proposed an automatic parking brake system, wherein an adjustment mechanism is provided within a brake caliper forming a brake fluid pressure chamber, a brake piston being slidably fitted into a cylinder hole of the brake caliper and having a rear face facing the brake fluid pressure chamber, the adjustment mechanism comprising an adjustment nut connected to the brake piston so that relative rotation is not possible and housed in the brake fluid pressure chamber, an adjustment bolt having a front end part screwed into the adjustment nut, a relay piston disposed in a rear part of the brake fluid pressure chamber and slidably fitted into the brake caliper in a liquid-tight manner so that the relay piston cannot rotate around the axis but can move in the axial direction, and a small piston integrally and coaxially connected to a rear part of the adjustment bolt, slidably fitted into the relay piston in a liquid-tight manner, and resiliently urged in a direction in which the small piston frictionally engages with the relay piston, the parking piston abutting against the relay piston from the rear side and being slidably fitted into the casing connected to the brake caliper, and the lock mechanism being provided within the casing to the rear side of the parking piston.

Effects of the Invention

In accordance with the first aspect of the present invention, since making the parking control fluid pressure act on the rear face of the parking piston makes the parking piston move forward and the lock mechanism mechanically lock the forward position of the parking piston, it is possible to obtain the parking brake state automatically; furthermore, when releasing the parking brake state, the parking release control fluid pressure may be made to act on the lock mechanism, and it is possible to automatically obtain a parking brake state by a simple structure without consuming power in the parking brake state.

Furthermore, in accordance with the second aspect of the present invention, the lock mechanism has a simple arrangement that includes the lock piston that is slidably fitted into the casing to the rear side of the parking piston so that a forward urging force acts on the lock piston when the parking piston is moved forward and that allows the parking release control fluid pressure to be made to act on the lock piston toward the rear, the cylindrical retaining tube connected coaxially and integrally to the rear part of the parking piston, the spheres retained at a plurality of positions in the peripheral direction of the retaining tube, and the insertion shaft that is connected integrally to the front end of the lock piston and that is in contact with each of the spheres from the inside of the retaining tube, the large diameter hole portion and the small diameter hole portion being formed on the inner face of the casing with the forward-facing annular latching step interposed therebetween; when the parking piston is moved forward, each sphere pushed upward by the large diameter shaft portion of the insertion shaft at the front end of the lock piston as a result of the lock piston moving forward engages with the latching step of the casing, thus preventing the parking piston from retreating and thereby giving a parking brake state; furthermore, making the parking release control fluid pressure act on the lock piston allows the lock piston to retreat, thus releasing the parking brake state.

Moreover, in accordance with the third aspect of the present invention, it is possible to easily apply the present invention to a conventionally known disk brake that includes an adjustment mechanism within a brake caliper and, moreover, since the parking piston is mechanically connected to the brake piston via the adjustment mechanism in the parking brake state, it is possible to maintain a reliable parking brake state regardless of expansion/contraction of brake fluid due to a change in temperature.

EXPLANATION OF REFERENCE NUMERALS AND SYMBOLS 10A, 10B, 10C Pump as Fluid Pressure Source
21c Third Hole Portion as Large Diameter Hole Portion
21d Fourth Hole Portion as Small Diameter Hole Portion
21g, 101f Latching Step
22, 102 Casing
23, 103 Parking Piston
24, 104 Lock Piston
25, 105 Lock Mechanism
51 Retaining tube
52 Sphere
53 Insertion Shaft
53a Small Diameter Shaft Portion
53b Large Diameter Shaft Portion
53c Step
56 Fluid Pressure Control Means
66A, 66B Control Valve as Fluid Pressure Control Means
75 Brake Caliper
76 Cylinder Hole
78 Brake Piston
80 Brake Fluid Pressure Chamber
82 Adjustment Mechanism
83 Adjustment Nut
84 Adjustment Bolt
85 Relay Piston
86 Small Piston
101b Rear Parking Piston Slide Hole Portion as Large Diameter Hole Portion
101c Front Lock Piston Slide Hole Portion as Small Diameter Hole Portion

BEST MODE FOR CARRYING OUT THE INVENTION

Modes for carrying out the present invention are explained below by reference to Embodiments of the present invention shown in the attached drawings.

Embodiment 1

Figure 1:
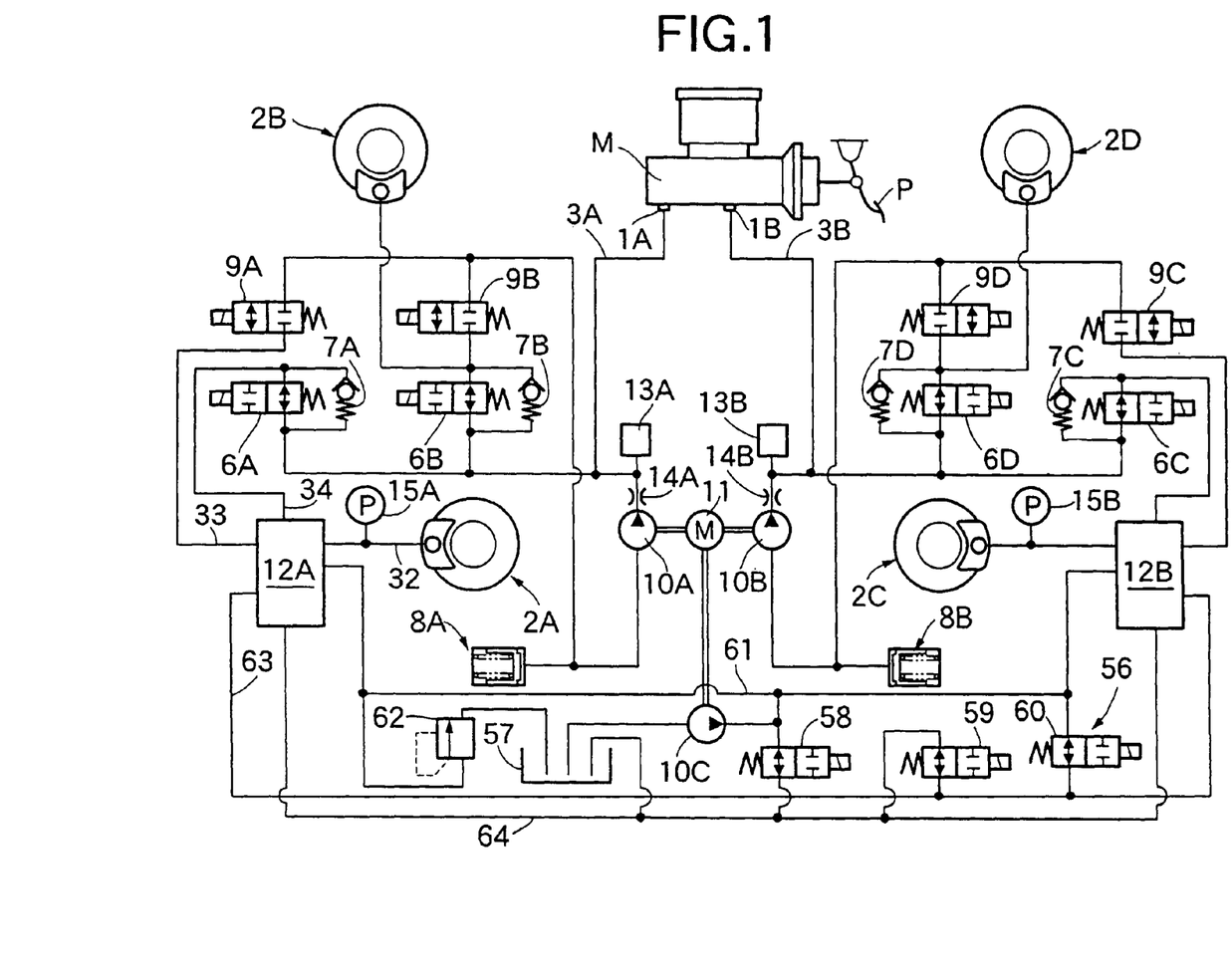
FIG. 1 is a fluid pressure circuit diagram of a vehicle brake system of a first embodiment (first embodiment).
Figure 2:
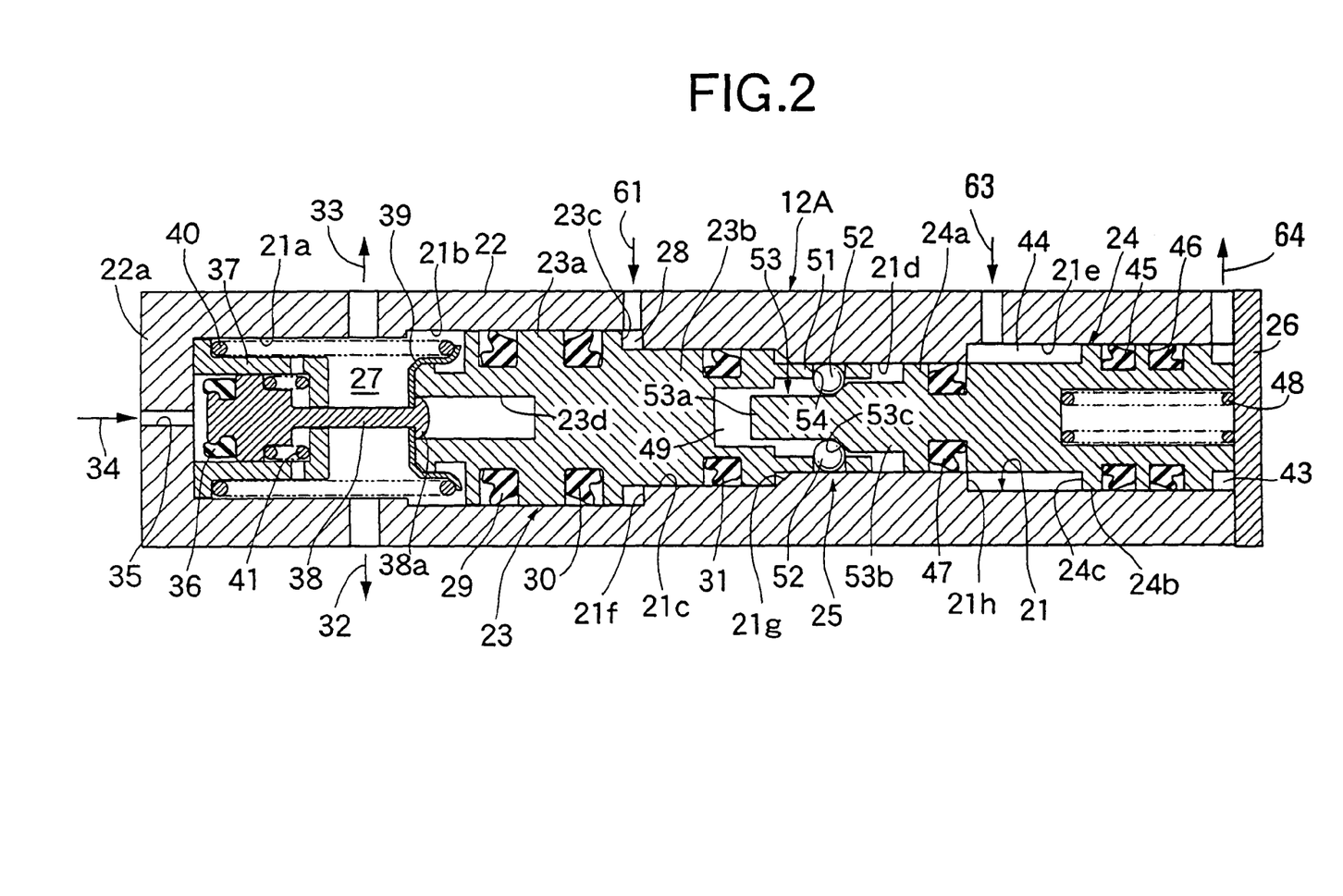
FIG. 2 is a longitudinal sectional view of a parking actuator at a time of non-parking braking (first embodiment).
Figure 3:
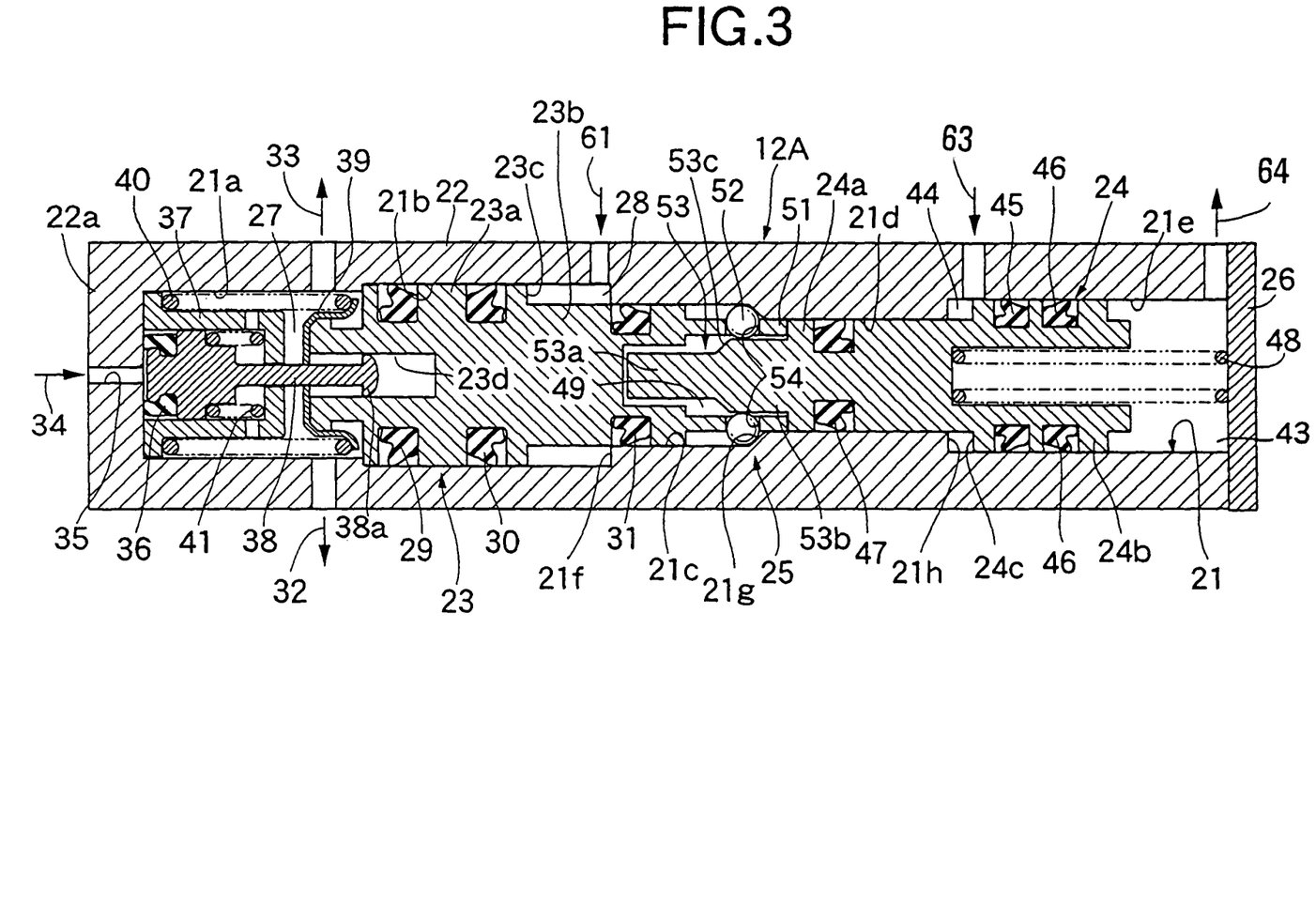
FIG. 3 is a longitudinal sectional view of the parking actuator at a time of parking braking (first embodiment).

FIG. 1 to FIG. 3 show a first embodiment of the present invention.
Referring first to FIG. 1, a tandem type master cylinder M includes first and second output ports 1A and 1B for generating a brake fluid pressure according to a depressing force that is applied by a vehicle driver to a brake pedal P; the first output port 1A is connected to a first output fluid pressure line 3A, and the second output port 1B is connected to a second output fluid pressure line 3B.

The first output fluid pressure line 3A is connected to a front left wheel brake 2A, which is a disk brake, via an inlet valve 6A, which is a normally open solenoid valve, and a parking actuator 12A, and is also connected to a rear right wheel brake 2B, which is a disk brake, via an inlet valve 6B, which is a normally open solenoid valve. Furthermore, the second output fluid pressure line 3B is connected to a front right wheel brake 2C, which is a disk brake, via an inlet valve 6C, which is a normally open solenoid valve, and a parking actuator 12B, and is also connected to a rear left wheel brake 2D, which is a disk brake, via an inlet valve 6D, which is a normally open solenoid valve. Moreover, the inlet valves 6A to 6D are connected in series to check valves 7A to 7D respectively.

Provided between a first reservoir 8A, which corresponds to the first output fluid pressure line 3A, and the front left wheel brake 2A and rear right wheel brake 2B are outlet valves 9A and 9B respectively, which are normally closed solenoid valves; and provided between a second reservoir 8B, which corresponds to the second output fluid pressure line 3B, and the front right wheel brake 2C and rear left wheel brake 2D are outlet valves 9C and 9D respectively, which are normally closed solenoid valves.

A first pump 10A having its intake side connected to the first reservoir 8A and its discharge side connected to the inlet valves 6A and 6B, a second pump 10B having its intake side connected to the second reservoir 8B and its discharge side connected to the inlet valves 6C and 6D, and a third pump 10C as a fluid pressure source are driven by one common electric motor 11, and first and second dampers 13A and 13B are connected to the discharge sides of the first and second pumps 10A and 10B respectively.

When not operating, that is, at a time of non-parking braking, the two parking actuators 12A and 12B connect the front left wheel and front right wheel brakes 2A and 2C to the inlet valves 6A and 6C as well as to the outlet valves 9A and 9A, and at a time of normal braking when there is no possibility of the wheels locking, each of the inlet valves 6A to 6D is put into a de-energized valve-open state, each of the outlet valves 9A to 9D is put into a de-energized valve-closed state, and the brake fluid pressure outputted from the first output port 1A of the master cylinder M acts on the front left wheel and rear right wheel brakes 2A and 2B via the inlet valves 6A and 6B. Furthermore, the brake fluid pressure outputted from the second output port 1B of the master cylinder M acts on the front right wheel and rear left wheel brakes 2C and 2D via the inlet valves 6C and 6D.

When a wheel nearly comes into a locked state during the above-mentioned braking, among the inlet valves 6A to 6D, the inlet valve corresponding to the wheel that has nearly come into the locked state is energized and closed, and among the outlet valves 9A to 9D, the outlet valve corresponding to the above wheel is energized and opened. Part of the brake fluid pressure on the wheel that has nearly come into the locked state is thereby absorbed by the first reservoir 8A or the second reservoir 8B, and the brake fluid pressure on the wheel that has nearly come into the locked state is reduced.

Furthermore, when maintaining the brake fluid pressure at a constant level, the inlet valves 6A to 6D are energized and closed and the outlet valves 9A to 9D are de-energized and closed and, moreover, when increasing the brake fluid pressure, the inlet valves 6A to 6D may be put into a de-energized valve-open state, and the outlet valves 9A to 9D may be put into a de-energized valve-closed state.

Controlling the de-energization/energization of each of the inlet valves 6A to 6D and each of the outlet valves 9A to 9D in this way enables the wheels to be braked efficiently without being locked.

During the above-mentioned antilock brake control, the electric motor 11 is rotationally operated, the first and second pumps 10A and 10B are driven accompanying the operation of the electric motor 11, and the brake fluid absorbed by the first and second reservoirs 8A and 8B is therefore taken into the first and second pumps 10A and 10B and then circulated to the first and second output fluid pressure lines 3A and 3B via the first and second dampers 13A and 13B. Due to such circulation of the brake fluid, it is possible to prevent any increase in the amount by which the brake pedal P is depressed due to the first and second reservoirs 8A and 8B absorbing the brake fluid. Moreover, pulsation of the discharge pressure of the first and second pumps 10A and 10B is suppressed by operation of the first and second dampers 13A and 13B, and the above circulation does not impair the operational feel of the brake pedal P.

Furthermore, pressure sensors 15A and 15B for detecting brake fluid pressure are connected to the front left wheel and front right wheel brakes 2A and 2C.

In FIG. 2, the parking actuator 12A includes a casing 22 forming a slide hole 21 having opposite ends closed, a parking piston 23 slidably fitted into the casing 22 so that a parking brake state can be obtained by forward movement in response to the action of a parking control fluid pressure on the rear face, and a lock mechanism 25 provided within the casing 22 to the rear of the parking piston 23 so that it automatically locks in response to forward movement of the parking piston 23 in order to mechanically lock the parking piston 23 at the forward position and unlocks in response to the action of a parking release control fluid pressure.

The slide hole 21 is formed from a first hole portion 21a having its front end closed by an end wall 22a of the casing 22, a second hole portion 21b formed so as to have a larger diameter than that of the first hole portion 21a and connected coaxially to the rear end of the first hole portion 21a, a third hole portion 21c as a large diameter hole portion formed so as to have a smaller diameter than that of the second hole portion 21b and connected coaxially to the rear end of the second hole portion 21b, a fourth hole portion 21d as a small diameter hole portion formed so as to have a smaller diameter than that of the third hole portion 21c and connected coaxially to the rear end of the third hole portion 21c, and a fifth hole portion 21e formed so as to have a larger diameter than that of the fourth hole portion 21d and connected coaxially to the rear end of the fourth hole portion 21d, the fifth hole portion 21e having its rear end closed by an end wall member 26 mounted on the casing 22.

A forward-facing annular step 21f is formed on an inner face of the casing 22 between the second and third hole portions 21b and 21c, a forward-facing annular latching step 21g is formed on the inner face of the casing 22 between the third and fourth hole portions 21c and 21d in a middle section of the slide hole 21, and a rearward-facing annular step 21h is formed on the inner face of the casing 22 between the fourth and fifth hole portions 21d and 21e.

The parking piston 23 integrally has a large diameter portion 23a slidably fitted into the second hole portion 21b of the slide hole 21, and a small diameter portion 23b connected coaxially to the rear end of the large diameter portion 23a so as to be slidably fitted into the third hole portion 21c of the slide hole 21, and a step 23c is formed on the parking piston 23 so as to face the step 21f of the casing 22, the step 23c, which is interposed between the large diameter portion 23a and the small diameter portion 23b, being slidably fitted into the casing 22 so that the front face, that is, the front face of the large diameter portion 23a, faces a fluid pressure chamber 27 formed between the casing 22 and the end wall 22a. Moreover, an annular parking control fluid pressure chamber 28 is formed between the casing 22 and the parking piston 23 between the two steps 23c and 21f, a pair of annular seals 29 and 30 for sealing between the fluid pressure chamber 27 and the parking control fluid pressure chamber 28 are mounted on an outer face of the large diameter portion 23a, and an annular seal 31 for sealing the parking control fluid pressure chamber 28 from the rear side is mounted on an outer face of the small diameter portion 23b.

Connected to the casing 22 are a fluid pressure line 32 providing communication between the fluid pressure chamber 27 and the front left wheel brake 2A, and a fluid pressure line 33 providing communication between the fluid pressure chamber 27 and the outlet valve 9A. Furthermore, a valve hole 35 is bored in a central section of the end wall 22a of the casing 22, the valve hole 35 being connected to the inlet valve 6A via a fluid pressure line 34.

A valve body 36 that is capable of blocking the valve hole 35 by being seated on an inner face of the central section of the end wall 22a is housed within a front retainer 37 formed in a bottomed cylindrical shape so that the valve body 36 abuts against the inner face of the central section of the end wall 22a, the valve body 36 being mounted at the front end of a rod 38 running movably through the front retainer 37. Furthermore, a dish-shaped rear retainer 39 abuts against the front end of the parking piston 23, and a return spring 40 is provided in a compressed state between the front retainer 37 and the rear retainer 39, the return spring 40 urging the parking piston 23 rearward so as to increase the gap between the two retainers 37 and 39. Moreover, a rear part of the rod 38 runs through the rear retainer 39 in an axially movable manner, an engagement collar 38a is provided integrally with the rear end of the rod 38, the engagement collar 38a abutting against the rear retainer 39 from the rear side, and a recess 23d housing the rear part of the rod 38 is provided coaxially in the middle of a front end part of the parking piston 23.

A valve spring 41 having a smaller spring load than that of the return spring 40 is provided in a compressed state between the front retainer 37 and a front part of the rod 38, and the valve body 36 is urged by the valve spring 41 in a direction that blocks the valve hole 35.

When the parking piston 23 is moved forward against the spring force of the return spring 40 by making a parking control fluid pressure act on the parking control fluid pressure chamber 28, as shown in FIG. 3 the valve body 36 is seated on the end wall 22a due to the spring force of the valve spring 41, thus closing the valve hole 35 and thereby cutting off communication between the inlet valve 6A and the front left wheel brake 2A. On the other hand, the volume of the fluid pressure chamber 27 decreases to thus generate a parking brake fluid pressure in the fluid pressure chamber 27, and this fluid pressure acts on the front left wheel brake 2A via the fluid pressure line 32, thus giving a parking brake state.

The lock mechanism 25 includes a lock piston 24, a cylindrical retaining tube 51, spheres 52, 52, and an insertion shaft 53, the lock piston 24 being disposed to the rear of the parking piston 23 so that when the parking piston 23 moves forward a forward urging force acts on the lock piston 24 and being slidably fitted into the casing 22 so that a parking release control fluid pressure can be made to act on the lock piston 24 toward the rear, the retaining tube 51 being connected integrally and coaxially to a rear part of the parking piston 23, the spheres 52, 52 being retained at a plurality of positions in the peripheral direction of the retaining tube 51 so that the spheres 52, 52 can move along the radial direction of the retaining tube 51, and the insertion shaft 53 being inserted into the retaining tube 51 so that it can move axially relative thereto and connected integrally to the front end of the lock piston 24 so as to be in contact with the spheres 52, 52 from the inside of the retaining tube 51. An open chamber 49 formed within the casing 22 between the parking piston 23 and the lock piston 24 is open to the outside via an open hole (not illustrated) provided in the casing 22.

The lock piston 24 integrally has a small diameter portion 24a that is slidably fitted into the fourth hole portion 21d of the slide hole 21 and a large diameter portion 24b that is coaxially connected to the rear end of the small diameter portion 24a so as to be slidably fitted into the fifth hole 21e of the slide hole 21, and a step 24c is formed on the lock piston 24 so as to face the step 21h of the casing 22, the step 24c, which is interposed between the small diameter portion 24a and the large diameter portion 24b, being slidably fitted into the casing 22 so as to make its rear face, that is, the rear face of the large diameter portion 24a, face a spring chamber 43 formed between itself and the end wall member 26 mounted on the casing 22. Moreover, an annular parking release control fluid pressure chamber 44 is formed between the casing 22 and the lock piston 24 between the two steps 24c and 21h, a pair of annular seals 45 and 46 for sealing between the spring chamber 43 and the parking release control fluid pressure chamber 44 are mounted on an outer face of the large diameter portion 24a, and an annular seal 47 for sealing between the parking release control fluid pressure chamber 44 and the open chamber 49 is mounted on an outer face of the small diameter portion 24b.

A spring 48 that has a smaller spring load than that of the return spring 40 is provided in a compressed state between the end wall member 26 and the lock piston 24, and the lock piston 24 is resiliently urged forward by the spring force of the spring 48.

Retaining holes 54, 54 are provided at a plurality of positions spaced in the peripheral direction of the retaining tube 51, and the spheres 52, 52 are inserted into and retained by the retaining holes 54, 54. Furthermore, the insertion shaft 53 is formed by coaxially and integrally connecting a front small diameter shaft portion 53a and a rear large diameter shaft portion 53b via a tapered step 53c that is capable of changing the position of contact of each of the spheres 52, 52 between the small diameter shaft portion 53a and the large diameter shaft portion 53b, the small diameter shaft portion 53a being in contact with each of the spheres 52, 52 so as to be capable of putting each of the spheres 52, 52 in rolling contact with the fourth hole portion 21d when the parking piston 23 is at a retreat limit state as shown in FIG. 2, and the large diameter shaft portion 53b being connected coaxially to the small diameter shaft portion 53a so as to push each of the spheres 52, 52 outward along the radial direction of the retaining tube 51 so as to make each of the spheres 52, 52 contact the third hole portion 21c when the parking piston 23 moves forward from the retreat limit as shown in FIG. 3 and the lock piston 24 moves forward.

In accordance with such a lock mechanism 25, when the parking piston 23 moves forward, the lock piston 24 moves forward due to the spring force of the spring 48, and the spheres 52, 52 pushed by the large diameter shaft portion 53b of the insertion shaft 53 at the front end of the lock piston 24 thus engage with the latching step 21g of the casing 22 as shown in FIG. 3, thereby preventing the parking piston 23 from retreating and thus giving a parking brake state; furthermore, making a parking release control fluid pressure act on the lock piston 24 to thus make the lock piston 24 retreat enables the parking brake state to be released.

The parking actuator 12B is arranged in the same manner as for the above-mentioned parking actuator 12A, and detailed explanation of the parking actuator 12B is therefore omitted.

Referring again to FIG. 1, the parking control fluid pressure and the parking release control fluid pressure that are made to act on the parking actuator 12A are obtained by controlling, by means of fluid pressure control means 56, a fluid pressure generated by the third pump 10C, which is driven by the electric motor 11 to thus pump brake fluid from a reservoir 57, the fluid pressure control means 56 including a control valve 58, a lock valve 59, and a release valve 60, which are normally open solenoid valves.

A parking control fluid pressure line 61 communicating with the parking control fluid pressure chambers 28 is connected to the casings 22 of the parking actuators 12A and 12B, and the discharge side of the third pump 10C is connected to the parking control fluid pressure line 61. Moreover, a relief valve 62 is provided between the parking control fluid pressure line 61 and the reservoir 57, and the discharge pressure of the third pump 10C is regulated so as to be constant by the relief valve 62.

Furthermore, connected to the casings 22 of the parking actuators 12A and 12B are a parking release control fluid pressure line 63 communicating with the parking release control fluid pressure chambers 44, and a release passage 64 communicating with the spring chambers 43 and the reservoir 57.

The control valve 58 is provided between the parking control fluid pressure line 61 and the release passage 64, the lock valve 59 is provided between the parking release control fluid pressure line 63 and the release passage 64, and the release valve 60 is provided between the parking control fluid pressure line 61 and the parking release control fluid pressure line 63.

In such fluid pressure control means 56, at a time of normal braking, the control valve 58, the lock valve 59, and the release valve 60 are in a de-energized valve-open state, and the parking control fluid pressure chambers 28 and the parking release control fluid pressure chambers 44 of the parking actuators 12A and 12B are in a fluid pressure released state. The parking pistons 23 of the parking actuators 12A and 12B are therefore at the retreat limit position, and the output fluid pressure of the master cylinder M can be made to act on the front left wheel and front right wheel brakes 2A and 2C.

Furthermore, when obtaining a parking brake state, the third pump 10C is driven by the electric motor 11, and the control valve 58 and the lock valve 59 are first energized and closed; due to the release valve 60 being in a de-energized valve-open state, a parking control fluid pressure is made to act on the parking control fluid pressure chambers 28 of the parking actuators 12A and 12B, and a fluid pressure is made to act on the parking release control fluid pressure chambers 44, thus making the parking piston 23 move forward while suppressing forward movement of the lock piston 24; subsequently, while maintaining the energized valve-closed state of the control valve 58 the lock valve 59 is de-energized and opened, and the release valve 60 is energized and closed. The fluid pressure of the parking release control fluid pressure chambers 44 is thereby released, and the lock piston 24 is moved forward by the spring force of the spring 48. Communication between the master cylinder M and the front left wheel and front right wheel brakes 2A and 2C is thereby cut off, brake fluid pressure generated in the fluid pressure chambers 27 acts on the front left wheel and front right wheel brakes 2A and 2C, and the lock mechanism 25 locks by making the spheres 52, 52 engage with the latching step 21g in response to forward movement of the parking pistons 23 and the lock pistons 24, thus enabling the parking brake state to be obtained. When engagement of each of the spheres 52, 52 with the latching step 21g is completed, the control valve 58, the lock valve 59, and the release valve 60 are returned to a de-energized valve-open state.

Furthermore, when the parking brake state is released, the third pump 10C is driven by the electric motor 11, the control valve 58 and the lock valve 59 are first energized and closed, and the release valve 60 is put into a de-energized valve-open state. A parking release control fluid pressure is thereby made to act toward the rear on the lock piston 24 to thus make the lock piston 24 retreat, and the lock mechanism 25 unlocks. By stopping driving the third pump 10C with the electric motor 11 and putting the control valve 58, the lock valve 59, and the release valve 60 in a de-energized valve-open state, the parking brake state is released.

When a vehicle, for which an engine idling state is stopped when there is a temporary stop while the vehicle is traveling, is temporarily stopped while partway along an ascent, it is desirable to gradually decrease the brake pressure until the vehicle driver detaches the foot from the brake pedal and instead depresses the accelerator pedal, and in such a case, after the third pump 10C is driven by the electric motor 11, the control valve 58 and the lock valve 59 are energized and closed, and the release valve 60 is put into a de-energized valve-open state, by energizing and closing the release valve 60 while maintaining an energized and valve-closed state of the lock valve 59 and further carrying out duty control so that an energized valve-closed state and a de-energized valve-open state of the control valve 58 are repeatedly switched over, it becomes possible to regulate the pressure so that the brake pressure gradually decreases. When this control is completed, drive of the third pump 10C by the electric motor 11 is stopped, the control valve 58 is de-energized and opened, and after a predetermined period of time has elapsed, the lock valve 59 and the release valve 60 are put into a de-energized valve-open state.

The operation of the first embodiment is now explained. The parking actuators 12A and 12B include the parking piston 23, which is slidably fitted into the casing 22 so as to obtain a parking brake state by forward movement in response to a parking control fluid pressure acting on its rear face, and the lock mechanism 25, which is provided within the casing to the rear of the parking piston 23 so as to automatically lock in response to forward movement of the parking piston 23 in order to mechanically lock the parking piston 23 at a forward position and unlock in response to a parking release control fluid pressure acting thereon, and since the fluid pressure generated by the third pump 10C for generating a fluid pressure by the operation of the electric motor 11 is controlled by the fluid pressure control means 56 so as to give a parking control fluid pressure and a parking release control fluid pressure, it is possible to automatically obtain a parking brake state by a simple structure and without power being consumed in the parking brake state.

Moreover, the lock mechanism 25 has a simple arrangement that includes the lock piston 24, which is slidably fitted into the casing 22 to the rear side of the parking piston 23 so that a forward urging force of the spring 48 acts on the lock piston 24 when the parking piston 23 is moved forward and allows a parking release control pressure to be made to act on the lock piston 24 toward the rear, the cylindrical retaining tube 51, which is integrally and coaxially connected to the rear part of the parking piston 23, the spheres 52, 52, which are retained at a plurality of positions in the peripheral direction of the retaining tube 51 and can move along the radial direction of the retaining tube 51, and the insertion shaft 53, which is axially relatively movably inserted into the retaining tube 51 and integrally connected to the front end of the lock piston 24 so as to be in contact with the spheres 52, 52 from the inside of the retaining tube 51, the third and fourth hole portions 21c and 21d being formed on the inner face of the casing 22 so that the forward-facing annular latching step 21g is interposed therebetween.

Embodiment 2

Figure 4:
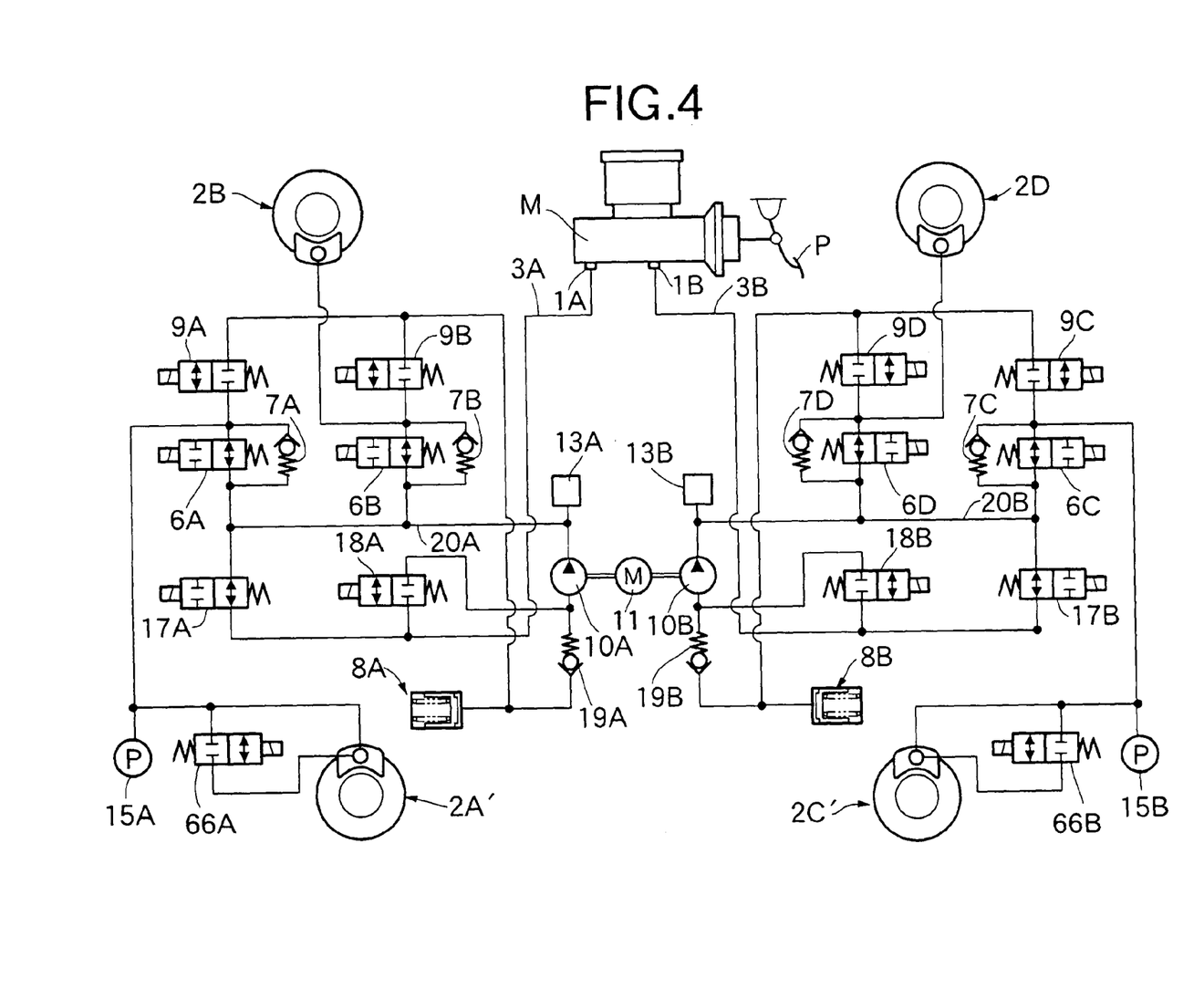
FIG. 4 is a fluid pressure circuit diagram of a vehicle brake system of a second embodiment (second embodiment).
Figure 5:
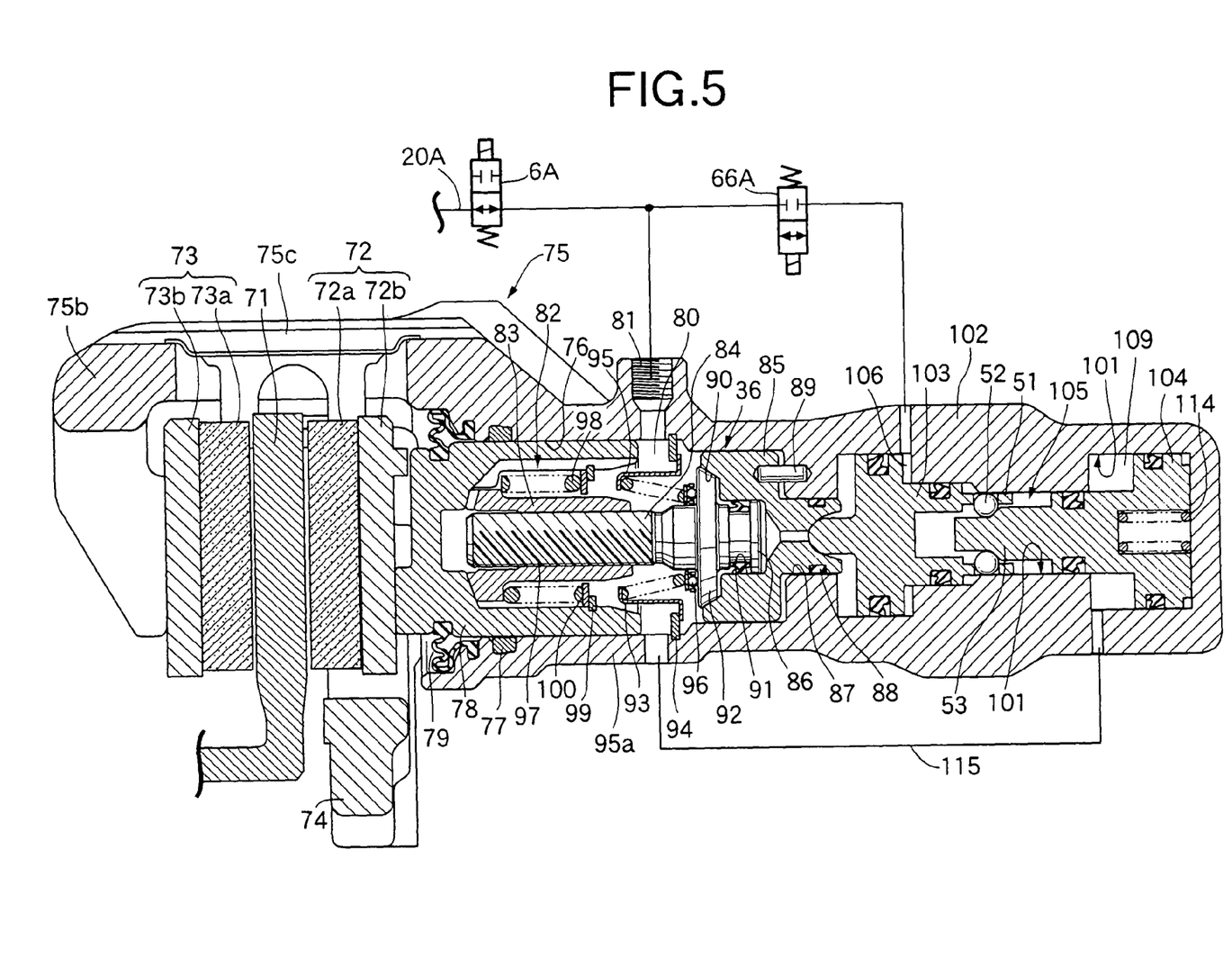
FIG. 5 is a longitudinal sectional view of a disk brake at a time of non-parking braking (second embodiment).
Figure 6:
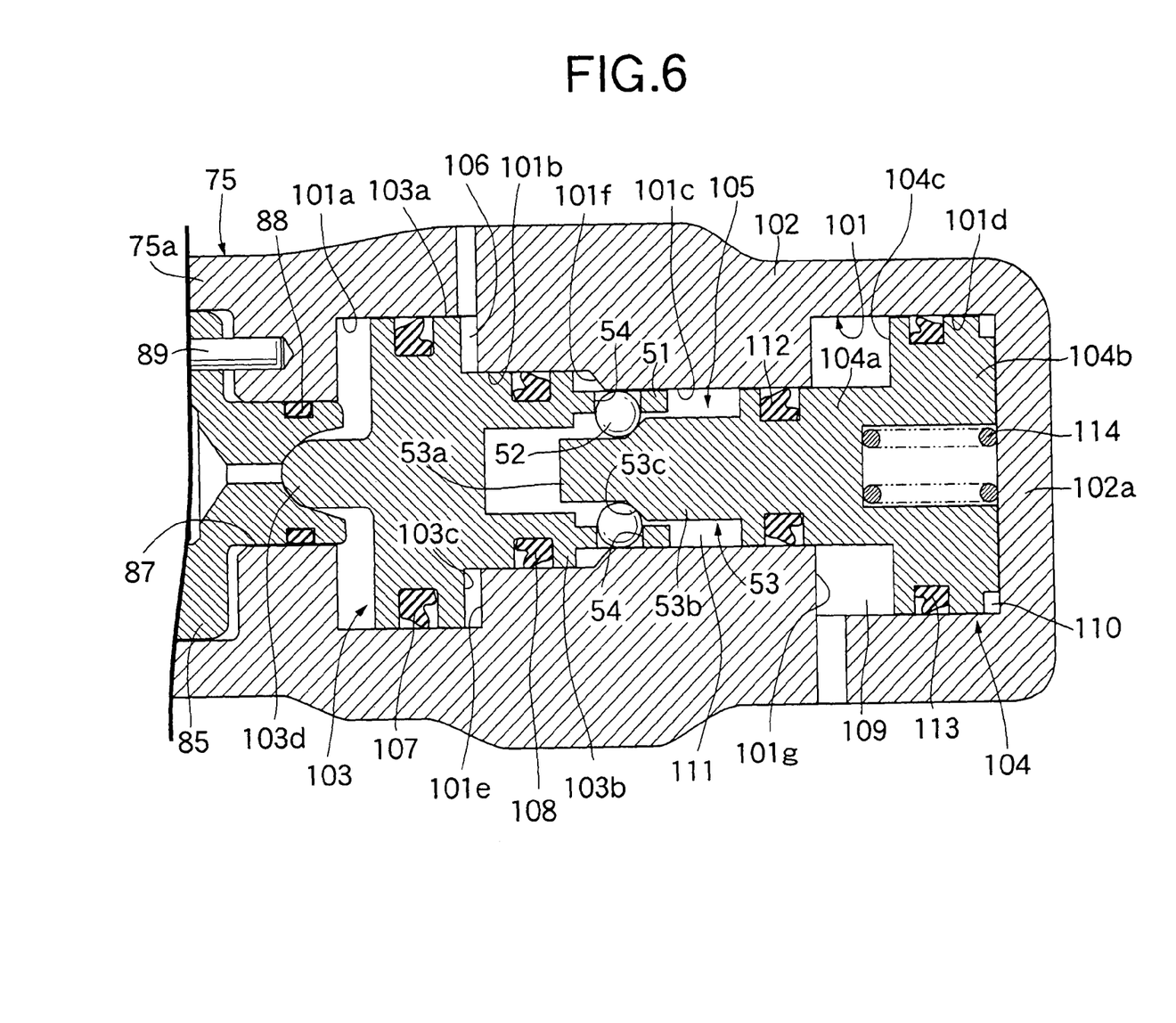
FIG. 6 is an enlarged view of an essential part in FIG. 5 (second embodiment).

FIG. 4 to FIG. 6 show a second embodiment of the present invention, and portions corresponding to those of the first embodiment are denoted by the same reference numerals and symbols.

First, in FIG. 4, a first output fluid pressure line 3A communicating with a first output port 1A of a master cylinder M is connected to a fluid pressure line 20A via a cut valve 17A, which is a normally open solenoid valve, and a second output fluid pressure line 3B communicating with a second output port 1B of the master cylinder M is connected to a fluid pressure line 20B via a cut valve 17B, which is a normally open solenoid valve.

Furthermore, first and second reservoirs 8A and 8B are connected to intake sides of first and second pumps 10A and 10B driven by a common electric motor 11 via one-way valves 19A and 19B that allow brake fluid to flow toward the pumps 10A and 10B, the first and second output fluid pressure lines 3A and 3B are connected to portions between the first and second pumps 10A and 10B and the one-way valves 19A and 19B via suction valves 18A and 18B, which are normally closed solenoid valves, and the fluid pressure lines 20A and 20B are connected to discharge sides of the first and second pumps 10A and 10B via first and second dampers 13A and 13B.

By operating the electric motor 11 in a state in which the suction valves 18A and 18B are energized and opened and the cut valves 17A and 17B are energized and closed, the first and second pumps 10A and 10B, which function as fluid pressure sources, take in the brake fluid from the master cylinder M side and discharge pressurized brake fluid into the fluid pressure lines 20A and 20B.

The fluid pressure line 20A is connected to a front left wheel brake 2A', which is a disk brake equipped with a parking brake mechanism, via an inlet valve 6A, and is also connected to a rear right wheel brake 2B, which is a disk brake, via an inlet valve 6B. Furthermore, the fluid pressure line 20B is connected to a front right wheel brake 2C', which is a disk brake equipped with a parking brake mechanism, via an inlet valve 6C, and is also connected to a rear left wheel brake 2D, which is a disk brake, via an inlet valve 6D.

In FIG. 5, in the front left wheel brake 2A', which is the disk brake equipped with the parking brake mechanism, a first friction pad 72 and a second friction pad 73 are disposed so as to oppose each other on opposite sides of a brake disk 71 that rotates together with the wheel. These first and second friction pads 72 and 73 are formed from linings 72a and 73a that can abut against the brake disk 71, and back plates 72b and 73b fixed to rear faces of the linings 72a and 73a, and the back plates 72b and 73b are supported, so that they can move in the axial direction of a brake piston 78, on a bracket 74 fixed to a vehicle body. Furthermore, a brake caliper 75 straddling the first and second friction pads 72 and 73 is supported on the bracket 74 so that it can move freely in the axial direction of the brake piston 78.

The brake caliper 75 includes a first clamping arm 75a facing the back plate 72b of the first friction pad 72 and a second clamping arm 75b facing the back plate 73b of the second friction pad 73, and the first and second clamping arms 75a and 75b are integrally connected via a bridging part 75c running past an outer peripheral part of the brake disk 71. A cylinder hole 76 is provided in the first clamping arm 75a, and the brake piston 78, which has a cup shape, is slidably fitted into the cylinder hole 76 via a seal 77. A forward end part of the brake piston 78 facing the back plate 72b of the first friction pad 72 so as to be able to abut thereagainst is connected to an open end of the cylinder hole 76 by a bellows-shaped dust cover 79; furthermore, a brake fluid pressure chamber 80 is formed within the first clamping arm 75a, the rear face of brake piston 78 facing the brake fluid pressure chamber 80, and the brake fluid pressure chamber 80 is connected to the inlet valve 6A via a port 81 provided in the first clamping arm 75a.

An adjustment mechanism 82 is provided within the first clamping arm 75a of the brake caliper 75, and this adjustment mechanism 82 includes an adjustment nut 83, an adjustment bolt 84, a relay piston 85, and a small piston 86, the adjustment nut 83 being connected to the brake piston 78 so that relative rotation is not possible and housed within the brake fluid pressure chamber 80, the adjustment bolt 84 having its front end part screwed into the adjustment nut 83, the relay piston 85 being disposed in a rear part of the brake fluid pressure chamber 80 and slidably fitted into the brake caliper 75 in a liquid-tight manner so that it cannot rotate around the axis but can move in the axial direction, and the small piston 86 being connected integrally and coaxially to a rear part of the adjustment bolt 84, slidably fitted into the relay piston 85 in a liquid-tight manner, and resiliently urged in a direction in which it frictionally engages with the relay piston 85.

A relay cylinder hole 87 having a smaller diameter than that of the cylinder hole 76 is provided coaxially in an end part, on the side opposite to the brake disk 71, of the first clamping arm 75a of the brake caliper 75, and a stepped rear part of the relay piston 85 is slidably fitted into the relay cylinder hole 87 via a seal 88 while a front part of the relay piston 85 is inserted into a rear part of the cylinder hole 76. Moreover, opposite end parts of a restricting pin 89 are fitted into the brake caliper 75 and the relay piston 85, the restricting pin 89 being disposed at a position offset from the axis of the cylinder hole 76 so as to have an axis that is parallel to the cylinder hole 76 and the relay cylinder hole 87. The relay piston 85 is thereby prevented from rotating around an axis that is coaxial with the cylinder hole 76 and the relay cylinder hole 87 and is supported by the brake caliper 75 so that it can move along the axis.

A small cylinder hole 91 is coaxially provided in the relay piston 85, the small cylinder hole 91 having a tapered clutch face 90 in an opening at the front end. A movable clutch body 92 and the small piston 86 are coaxially and integrally connected to a rear part of the adjustment bolt 84, the movable clutch body 92 being capable of frictionally engaging with the clutch face 90, and the small piston 86 being slidably fitted into the small cylinder hole 91 in a liquid-tight manner.

One end of a clutch spring 93 exhibiting a spring force for frictionally engaging the movable clutch body 92 with the clutch face 90 of the relay piston 85 abuts against a retainer 95 engaged with and supported by a clip 94 mounted on an inner face of the cylinder hole 76, and the other end of the clutch spring 93 abuts against the movable clutch body 92 via a ball bearing 96.

The adjustment nut 83 and the adjustment bolt 84 mesh with each other by means of a quick screw 97 having a plurality of threads and grooves having a large pitch. One end of an over-adjustment prevention spring 98 exhibiting a spring force urging the adjustment nut 83 toward the brake piston 78 abuts against the adjustment nut 83, and the other end of the over-adjustment prevention spring 98 abuts against and is supported by a retainer 100 engaged with and supported by a clip 99 mounted on an inner face of the brake piston 78.

The adjustment nut 83 and the brake piston 78 are unable to rotate relative to each other due to interlocking in the abutment parts thereof, and the back plate 72b of the first friction pad 72 and the brake piston 78 are unable to rotate relative to each other due to interlocking thereof.

In such an adjustment mechanism 82, when a fluid pressure is supplied to the brake fluid pressure chamber 80 at a time of normal braking, the brake piston 78, which has received the fluid pressure, moves leftward in FIG. 5 within the cylinder hole 76 while elastically deforming the seal 77, and presses the first friction pad 72 against one side of the brake disk 71; due to its reaction the brake caliper 75 moves rightward, which is a direction opposite to the direction in which the brake piston 78 has moved, and the second clamping arm 75b presses the second friction pad 73 against the other side of the brake disk 71. As a result, the first and second friction pads 72 and 73 abut against opposite sides of the brake disk 71 with an equal surface pressure, thus generating a braking force for braking the wheel.

During the above braking, the fluid pressure supplied to the brake fluid pressure chamber 80 does not generate an axial load on the adjustment nut 83, but generates a rightward load on the movable clutch body 92 integral with the adjustment bolt 84 meshing with the adjustment nut 83, the rightward load having a size corresponding to the product of the cross-sectional area of the small piston 86 and the above fluid pressure, and a frictional engagement force according to the load acts between the movable clutch body 92 and the clutch face 90 of the relay piston 85.

At a time of normal braking, since the fluid pressure acting on the brake fluid pressure chamber 80 is relatively small, the frictional engagement force acting between the movable clutch body 92 and the relay piston 85 is also relatively small. Because of this, when the brake piston 78 moves forward accompanying the progress of wear of the linings 72a and 73a of the first and second friction pads 72 and 73, the adjustment nut 83 moves forward together with the brake piston 78 due to the resilient force of the over-adjustment prevention spring 98, and the movable clutch body 92 integral with the adjustment bolt 84 meshing with the adjustment nut 83 is detached from the clutch face 90 of the relay piston 85 against the fluid pressure acting on the brake fluid pressure chamber 80 and the resilient force of the clutch spring 93.

When the movable clutch body 92 detaches from the clutch face 90 of the relay piston 85, the adjustment bolt 84, which is urged rightward by the fluid pressure acting on the movable clutch body 92 and the resilient force of the clutch spring 93, moves to the right while rotating on the quick screw 97 relative to the adjustment nut 83, which is unable to rotate, and the movable clutch body 92 re-engages with the clutch face 90 of the relay piston 85. In this process, the movable clutch body 92 can rotate smoothly due to the action of the ball bearing 96 disposed between the movable clutch body 92 and the clutch spring 93.

In this way, accompanying the progress of wear of the linings 72a and 73a of the first and second friction pads 72 and 73, the adjustment nut 83 moves to the left relative to the adjustment bolt 84 so as to compensate for the amount of wear, and it is therefore possible to automatically maintain a constant clearance between the brake disk 71 and the linings 72a and 73a of the first and second friction pads 72 and 73 when not braking.

When the fluid pressure acting on the brake fluid pressure chamber 80 is decreased in order to release the braking state, although the brake piston 78 retreats due to the deformation restoration force of the seal 77, since the retreating force makes the movable clutch body 92 engage with the clutch face 90 of the relay piston 85 via the adjustment nut 83 and the adjustment bolt 84, rotation of the adjustment bolt 84 relative to the adjustment nut 83 is restricted. The brake piston 78 therefore can only retreat by a stroke corresponding to the backlash between the adjustment nut 83 and the adjustment bolt 84, thereby giving an appropriate clearance, corresponding to the above backlash, between the first and second friction pads 72 and 73 and the brake disk 71.

When severe braking is carried out, the above-mentioned automatic adjustment is carried out until the fluid pressure of the brake fluid pressure chamber 80 increases up to a predetermined value that deforms the brake caliper 75, and when the fluid pressure exceeds the predetermined value, since the movable clutch body 92 is pressed firmly against the clutch face 90 of the relay piston 85 due to the fluid pressure, the movable clutch body 92 and the relay piston 85 are joined so that they cannot rotate relative to each other. As a result, since the adjustment bolt 84 is restrained so that it does rotate, and the adjustment nut 83, which is intrinsically unable to rotate, remains on the adjustment bolt 84, when the brake piston 78 moves further forward accompanying elastic deformation of the brake caliper 75 due to the fluid pressure, it is only the brake piston 78 that moves forward while compressing the over-adjustment prevention spring 98, leaving the adjustment nut 83 behind. In this way, when severe braking is carried out, over-adjustment between the adjustment nut 83 and the adjustment bolt 84 is prevented.

Referring in addition to FIG. 6, a casing 102 is connected integrally to the first clamping arm 75a of the brake caliper 75, the casing 102 extending on the opposite side to the brake disk 71, and a parking piston 103 abutting against the relay piston 85 from the rear side is slidably fitted into the casing 102.

The casing 102 forms a slide hole 101 that is coaxial with the cylinder hole 76 of the brake caliper 75, the parking piston 103, which is capable of giving a parking brake state by forward movement in response to a parking control fluid pressure acting on the rear face, is slidably fitted into the slide hole 101 so as to abut against the relay piston 85 from the rear, and a lock mechanism 105 is provided within the casing 102 to the rear side of the parking piston 103, the lock mechanism 105 automatically locking in response to forward movement of the parking piston 103 in order to mechanically lock the parking piston 103 at the forward position and unlocking in response to a parking release control fluid pressure acting thereon.

The slide hole 101 is formed from a front parking piston slide hole portion 101a, a rear parking piston slide hole portion 101b, a front lock piston slide hole portion 101c, and a rear lock piston slide hole portion 101d, the front parking piston slide hole portion 101a having a larger diameter than that of the relay cylinder hole 87 and being coaxially connected to the rear end of the relay cylinder hole 87, the rear parking piston slide hole portion 101b being formed as a large diameter hole portion so as to have a smaller diameter than that of the front parking piston slide hole portion 101a and being coaxially connected to the rear end of the front parking piston slide hole portion 101a, the front lock piston slide hole portion 101c being formed as a small diameter hole portion so as to have a smaller diameter than that of the rear parking piston slide hole portion 101b and being coaxially connected to the rear end of the rear parking piston slide hole portion 101b, the rear lock piston slide hole portion 101d being formed so as to have a larger diameter than that of the front lock piston slide hole portion 101c and being coaxially connected to the rear end of the front lock piston slide hole portion 101c, and the rear end of the rear lock piston slide hole portion 101d being closed by a rear end wall 102a of the casing 102.

A forward-facing annular step 101e is formed on an inner face of the casing 102 between the front parking piston slide hole portion 101a and the rear parking piston slide hole portion 101b, a forward-facing annular latching step 101f is formed on the inner face of the casing 102 between the rear parking piston slide hole portion 101b and the front lock piston slide hole portion 101c, and a rearward-facing annular step 101g is formed on the inner face of the casing 102 between the front lock piston slide hole portion 101c and the rear lock piston slide hole portion 101d.

The parking piston 103 integrally has a large diameter portion 103a and a small diameter portion 103b, the large diameter portion 103a being slidably fitted into the front parking piston slide hole portion 101a, and the small diameter portion 103b being connected coaxially to a rear part of the large diameter portion 103a so as to have a rear-facing annular step 103c formed between itself and the large diameter portion 103a and being slidably fitted into the rear parking piston slide hole 101b, and a push rod 103d for pushing the relay piston 85 from the rear is integrally and coaxially connected to a central part at the front end of the parking piston 103.

An annular parking control fluid pressure chamber 106 is formed between the casing 102 and the parking piston 103 between the step 103c of the parking piston 103 and the step 101e of the casing 102, and annular seals 107 and 108 for sealing the parking control fluid pressure chamber 106 from opposite sides are mounted on outer faces of the large diameter portion 103a and the small diameter portion 103b of the parking piston 103. Moreover, a pressure receiving area of the parking piston 103 facing the parking control fluid pressure chamber 106 is set so as to be larger than a pressure receiving area of the small piston 86 facing the brake fluid pressure chamber 80.

The lock mechanism 105 includes a lock piston 104, a cylindrical retaining tube 51, spheres 52, 52, and an insertion shaft 53, the lock piston 104 being slidably fitted into the casing 102 to the rear side of the parking piston 103 so that when the parking piston 103 moves forward a forward urging force acts on the lock piston 104 and allowing a parking release control pressure to be made to act on the lock piston 104 toward the rear, the retaining tube 51 being connected integrally and coaxially to a rear part of the parking piston 103, the spheres 52, 52 being retained at a plurality of positions in the peripheral direction of the retaining tube 51 so that the spheres 52, 52 can move along the radial direction of the retaining tube 51, and the insertion shaft 53 being inserted into the retaining tube 51 so that it can move axially relative thereto and connected integrally to the front end of the lock piston 104 so as to be in contact with the spheres 52, 52 from the inside of the retaining tube 51.

The lock piston 104 integrally includes a small diameter portion 104a and a large diameter portion 104b, the small diameter portion 104a being slidably fitted into the front lock piston slide hole portion 101c, and the large diameter portion 104b being connected coaxially to a rear part of the small diameter portion 104a so as to have a forward-facing annular step 104c formed between itself and the small diameter portion 104a and being slidably fitted into the rear lock piston slide hole portion 101d.

An annular parking release control fluid pressure chamber 109 is formed between the lock piston 104 and the casing 102 between the step 104c of the lock piston 104 and the step 101g of the casing 102, a spring chamber 110 is formed between the rear end wall 102a of the casing 102 and the lock piston 104, and an open chamber 111 is formed within the casing 102 between the parking piston 103 and the lock piston 104, the open chamber 111 being open to the outside.

An annular seal 112 for sealing between the parking release control fluid pressure chamber 109 and the open chamber 111 is mounted on an outer face of the small diameter portion 104a of the lock piston 104, and an annular seal 113 for sealing between the parking release control fluid pressure chamber 109 and the spring chamber 110 is mounted on an outer face of the large diameter portion 104b of the lock piston 104.

A spring 114 is provided in a compressed state between the rear end wall 102a and the lock piston 104, and the lock piston 24 is resiliently urged forward by the spring force of the spring 114. Moreover, the spring load of the spring 114 is set so as to be smaller than the spring load of the clutch spring 93 of the adjustment mechanism 82.

The retaining tube 51, the spheres 52, 52 retained by retaining holes 54, 54 provided in the retaining tube 51, and the insertion shaft 53 are arranged in the same manner as for the lock mechanism 25 of the first embodiment.

The parking release control fluid pressure chamber 109 and the brake fluid pressure chamber 80 communicate with each other via a communication passage 115, the brake fluid pressure chamber 80 is connected to the parking control fluid pressure chamber 106 via a control valve 66A as fluid pressure control means, and the control valve 66A is, for example, a normally closed solenoid valve.

When obtaining a parking brake state, the first pump 10A is driven by the electric motor 11, the cut valve 17A is energized and closed, the suction valve 18A is energized and opened and, furthermore, the control valve 66A is energized and opened. This allows a brake fluid pressure to be made to act on the brake fluid pressure chamber 80, a parking control fluid pressure to be made to act on the parking control fluid pressure chamber 106, and a fluid pressure to be made to act on the parking release control fluid pressure chamber 109, thus making the brake piston 78 and the parking piston 103 move forward while suppressing forward movement of the lock piston 104; subsequently, drive of the first pump 10A by the electric motor 11 is stopped, the cut valve 17A is de-energized and opened, the suction valve 18A is de-energized and closed, and the control valve 66A is returned to a de-energized valve-closed state. By so doing, the fluid pressure of the parking release control fluid pressure chamber 109 is released, the lock piston 104 moves forward due to the spring force of the spring 114, and the lock mechanism 105 locks so as to engage the spheres 52, 52 with the latching step 101f in response to forward movement of the parking piston 103 and the lock piston 104. In order to release remaining pressure, when engagement of the spheres 52, 52 with the latching step 101f is completed, drive of the first pump 10A by the electric motor 11 may be stopped, and the cut valve 17A, the suction valve 18A, and the control valve 66A may be de-energized so as to return them to their original states.

In this way, when the parking piston 103 is locked by its forward movement, the relay piston 85 is moved forward by the push rod 103d of the parking piston 103, the movement of the relay piston 85 allows the brake piston 78 to move forward via the movable clutch body 92, the adjustment bolt 84, and the adjustment nut 83, and in the same manner as for normal braking, by pressing the linings 72a and 73a of the first and second friction pads 72 and 73 against opposite sides of the brake disk 71 so as to generate a braking force, a parking brake state can be obtained.

During the process of obtaining this parking brake state, since the relay piston 85 and the movable clutch body 92 are frictionally engaged by the pressing force of the parking piston 103 so that they cannot rotate relative to each other, relative rotation between the adjustment bolt 84 and the adjustment nut 83 is restricted. Therefore, when the front left wheel brake 2A' functions as a parking brake, the above-mentioned automatic adjustment by the adjustment mechanism 82 is not carried out.

Furthermore, when obtaining a parking brake state during normal braking operation, if a value detected by a pressure sensor 15A is sufficiently high, the control valve 66A may be energized and opened in a state in which the cut valve 17A is de-energized and opened and the suction valve 18A is de-energized and closed while driving of the first pump 10A by the electric motor 11 is not carried; furthermore, if a value detected by the pressure sensor 15A is low, the cut valve 17A may be energized and closed, the suction valve 18A may be energized and opened, and the control valve 66A may be energized and opened while driving of the first pump 10A by the electric motor 11 is carried out; and regardless of the value detected by the pressure sensor 15A, the cut valve 17A may be energized and closed, the suction valve 18A may be energized and opened, and the control valve 66A may be energized and opened while driving of the first pump 10A by the electric motor 11 is carried out.

When releasing the parking brake state, the first pump 10A is driven by the electric motor 11, the cut valve 17A is energized and closed, the suction valve 18A is energized and opened, and the control valve 66A is energized and opened. By so doing, the fluid pressures of the brake fluid pressure chamber 80, the parking control fluid pressure chamber 106, and the parking release control fluid pressure chamber 109 simultaneously increase; in this pressure increase process, a fluid pressure that is greater than the spring force of the spring 114 first acts on the lock piston 104 to thus make the lock piston 104 retreat, subsequently, the combined force of the clutch spring 93 and the fluid pressure in the retreat direction acting on the small piston 86 becomes larger than the pressing force in the forward direction acting on the parking piston 103 due to the fluid pressure of the parking control fluid pressure chamber 106, and the parking piston 103 thereby retreats. The lock mechanism 105 thereby unlocks to thus release the parking brake state.

The front right wheel brake 2C' has the same arrangement as that of the front left wheel brake 2A'; when obtaining a parking brake state for the front right wheel brake 2C', the second pump 10B is functioned as a fluid pressure source by operating the electric motor 11 in a state in which the suction valve 18B is energized and opened and the cut valve 17B is energized and closed, and opening/closing of the control valve 66B as fluid pressure control means is controlled.

In accordance with this second embodiment, not only can the same effects as those of the above-mentioned first embodiment be obtained, but it is also possible to easily apply the present invention to a conventionally known disk brake equipped with an adjustment mechanism 82 within a brake caliper 75 and, moreover, since in the parking brake state the parking piston 103 is mechanically connected to the brake piston 78 via the adjustment mechanism 82, a reliable parking brake state can be maintained regardless of expansion/contraction of brake fluid due to a change in temperature.

In the above-mentioned second embodiment, the control valves 66A and 66B are disposed between the brake fluid pressure chamber 80 and the parking control fluid pressure chamber 106, the brake fluid pressure chamber 80 and the parking release control fluid pressure chamber 109 communicate with each other via the communication passage 115, and the parking piston 103 and the lock piston 104 are moved with a time lag in response to changes in the fluid pressures of the brake fluid pressure chamber 80, the parking control fluid pressure chamber 106, and the parking release control fluid pressure chamber 109; in order to make such movement with a time lag more reliable, a solenoid open/close valve may be provided in the communication passage 115 and, furthermore, instead of the control valves 66A and 66B a three way solenoid valve may be used for switching over between a state in which there is communication between the brake fluid pressure chamber 80 and the parking control fluid pressure chamber 106 and a state in which there is communication between the brake fluid pressure chamber 80 and the parking release control fluid pressure chamber 109.

Although embodiments of the present invention are explained above, the present invention is not limited to the above-mentioned embodiments and may be modified in a variety of ways as long as the modifications do not depart from the present invention described in Claims.

The invention claimed is:

1. An automatic parking brake system, comprising:
   a casing having a slide bore formed therein, said slide bore including an enlarged diameter portion, a reduced diameter portion, and a ramped annular latching step interconnecting the enlarged diameter portion with the reduced diameter portion;
   a parking piston which is slidably fitted into the slide bore of the casing, wherein the casing has a parking control fluid pressure chamber defined therein between a rear face of the parking piston and the casing, said parking piston configured and arranged such that a parking brake state is obtained by forward movement thereof in response to a parking control fluid pressure acting on the parking control fluid pressure chamber;
   a lock mechanism having a lock piston which is slidably fitted into the casing, said lock piston being operable to advance or retreat relative to the parking piston, wherein said lock mechanism has a parking release control fluid pressure chamber defined therein between a front face of the lock piston and the casing, and said lock piston is urged forward by a spring, said lock mechanism further comprising:
      a cylindrical retaining tube integrally and coaxially connected to a rear part of the parking piston and having a hollow bore formed therein;
      a plurality of spheres retained at a plurality of positions in the peripheral direction of the retaining tube such that the spheres move along the radial direction of the retaining tube; and
      an insertion shaft inserted into the retaining tube, the insertion shaft is operable to move axially relative to the retaining tube, said insertion shaft connected integrally to the front end of the lock piston such that said insertion shaft is in contact with the spheres from the inside of the retaining tube;
   wherein the lock mechanism is configured and arranged to automatically lock in response to forward movement of the parking piston in order to mechanically lock the parking piston at a forward position, and to unlock in response to a parking release control fluid pressure acting on the parking release control fluid pressure chamber;

a fluid pressure source; and a fluid pressure control mechanism for controlling a fluid pressure generated by the fluid pressure source such that the parking control fluid pressure and the parking release control fluid pressure are obtained and separately controlled;

wherein the insertion shaft is formed by coaxially and integrally connecting a front small diameter shaft portion and a rear large diameter shaft portion via a tapered step, which is operable to change the position of contact of each of the spheres between the small diameter shaft portion and the large diameter shaft portion;

the small diameter shaft portion being in contact with each of the spheres for putting each of the spheres in rolling contact with an inner face of the small diameter hole portion in a state in which the parking piston is at a retreat limit, and the large diameter shaft portion being connected coaxially to the small diameter shaft portion for pushing each of the spheres outward along the radial direction of the retaining tube in order to make the spheres contact the large diameter hole portion in response to the parking piston moving forward from the retreat limit and the lock piston moving forward.

2. An automatic parking brake system, comprising:

a casing having a slide bore formed therein;

a parking piston which is slidably fitted into the slide bore of the casing, wherein the casing has a parking control fluid pressure chamber defined therein between a rear face of the parking piston and the casing, said parking piston configured and arranged such that a parking brake state is obtained by forward movement of the parking piston in response to a parking control fluid pressure acting on the parking control fluid pressure chamber;

a lock mechanism having a lock piston which is slidably fitted into the casing, said lock piston being operable to advance or retreat relative to the parking piston, wherein said lock mechanism has a parking release control fluid pressure chamber defined therein between a front face of the lock piston and the casing, and said lock piston is urged forward by a spring, wherein the lock mechanism is configured and arranged to automatically lock in response to forward movement of the parking piston in order to mechanically lock the parking piston at a forward position and to unlock in response to a parking release control fluid pressure acting on the parking release control fluid pressure chamber;

a fluid pressure source; and a fluid pressure control mechanism for controlling a fluid pressure generated by the fluid pressure source such that the parking control fluid pressure and the parking release control fluid pressure are obtained and separately controlled;

wherein:

the lock piston of the lock mechanism is positioned at the rear side of the parking piston such that a forward urging force acts on the lock piston at least when the parking piston moves forward, and is provided for allowing a parking release control pressure to act on the lock piston toward the rear, and the lock mechanism further comprises:

a cylindrical retaining tube integrally and coaxially connected to a rear part of the parking piston;

a plurality of spheres retained at a plurality of positions in the peripheral direction of the retaining tube such that the spheres move along the radial direction of the retaining tube; and an insertion shaft inserted into the retaining tube such that the insertion shaft moves axially relative to the retaining tube, said insertion shaft connected integrally to the front end of the lock piston for being in contact with the spheres from the inside of the retaining tube;

wherein the casing has a large diameter hole portion formed therein having a larger diameter than that of the retaining tube, and a small diameter hole portion being formed on an inner face thereof between the parking piston and the lock piston such that a forward-facing annular latching step is interposed between the large diameter hole portion and the small diameter hole portion, the small diameter hole portion being formed with a smaller diameter than that of the large diameter hole portion, configured to slidably receive the retaining tube therein, and being disposed to the rear of the large diameter hole portion; and wherein the insertion shaft is formed by coaxially and integrally connecting a front small diameter shaft portion and a rear large diameter shaft portion via a tapered step, which is configured to change the position of contact of each of the spheres between the small diameter shaft portion and the large diameter shaft portion;

the small diameter shaft portion being in contact with each of the spheres for putting each of the spheres in rolling contact with an inner face of the small diameter hole portion in a state in which the parking piston is at a retreat limit, and the large diameter shaft portion being connected coaxially to the small diameter shaft portion for pushing each of the spheres outward along the radial direction of the retaining tube in order to make the spheres contact the large diameter hole portion in response to the parking piston moving forward from the retreat limit and the lock piston moving forward.

3. The automatic parking brake system according to either claim 1 or claim 2, further comprising a brake caliper having an adjustment mechanism provided therein, said brake caliper having a brake fluid pressure chamber formed therein, a brake piston being slidably fitted into a cylinder hole of the brake caliper and having a rear face facing the brake fluid pressure chamber, the adjustment mechanism comprising:

an adjustment nut connected to the brake piston such that relative rotation is not possible and housed in the brake fluid pressure chamber, an adjustment bolt having a front end part screwed into the adjustment nut, a relay piston disposed in a rear part of the brake fluid pressure chamber and slidably fitted into the brake caliper in a liquid-tight manner such that the relay piston cannot rotate around the axis but moves in the axial direction, and a small piston integrally and coaxially connected to a rear part of the adjustment bolt, slidably fitted into the relay piston in a liquid-tight manner, and resiliently urged in a direction in which the small piston frictionally engages with the relay piston, the parking piston abutting against the relay piston from the rear side and being slidably fitted into the casing connected to the brake caliper and the lock mechanism being provided within the casing to the rear side of the parking piston.

4. An automatic parking brake system, comprising:

a casing having a slide bore formed therein;

a parking piston which is slidably fitted into the slide bore of the casing, wherein the casing has a parking control fluid pressure chamber defined therein between a rear face of the parking piston and the casing, said parking piston configured and arranged such that a parking brake state is obtained by forward movement of the parking piston in response to a parking control fluid pressure acting on the parking control fluid pressure chamber;

a lock mechanism having a lock piston which is slidably fitted into the casing, said lock piston being operable to advance or retreat relative to the parking piston, wherein said lock mechanism has a parking release control fluid pressure chamber defined therein between a front face of the lock piston and the casing, and said lock piston is urged forward by a spring, wherein the lock mechanism is configured and arranged to automatically lock in response to forward movement of the parking piston in order to mechanically lock the parking piston at a forward position and to unlock in response to a parking release control fluid pressure acting on the parking release control fluid pressure chamber;

a fluid pressure source;

a fluid pressure control mechanism for controlling a fluid pressure generated by the fluid pressure source such that the parking control fluid pressure and the parking release control fluid pressure are obtained and separately controlled;

and a brake caliper having an adjustment mechanism provided therein, said brake caliper having a brake fluid pressure chamber formed therein, a brake piston being slidably fitted into a cylinder hole of the brake caliper and having a rear face facing the brake fluid pressure chamber, the adjustment mechanism comprising:

an adjustment nut connected to the brake piston such that relative rotation thereof is not possible and housed in the brake fluid pressure chamber, an adjustment bolt having a front end part screwed into the adjustment nut, a relay piston disposed in a rear part of the brake fluid pressure chamber and slidably fitted into the brake caliper in a liquid-tight manner such that the relay piston cannot rotate around the axis but moves in the axial direction, and a small piston integrally and coaxially connected to a rear part of the adjustment bolt, slidably fitted into the relay piston in a liquid-tight manner, and resiliently urged in a direction in which the small piston frictionally engages with the relay piston, the parking piston abutting against the relay piston from the rear side and being slidably fitted into the casing connected to the brake caliper and the lock mechanism being provided within the casing to the rear side of the parking piston.

* * * * *